United States Patent Office 3,220,383
Patented Nov. 30, 1965

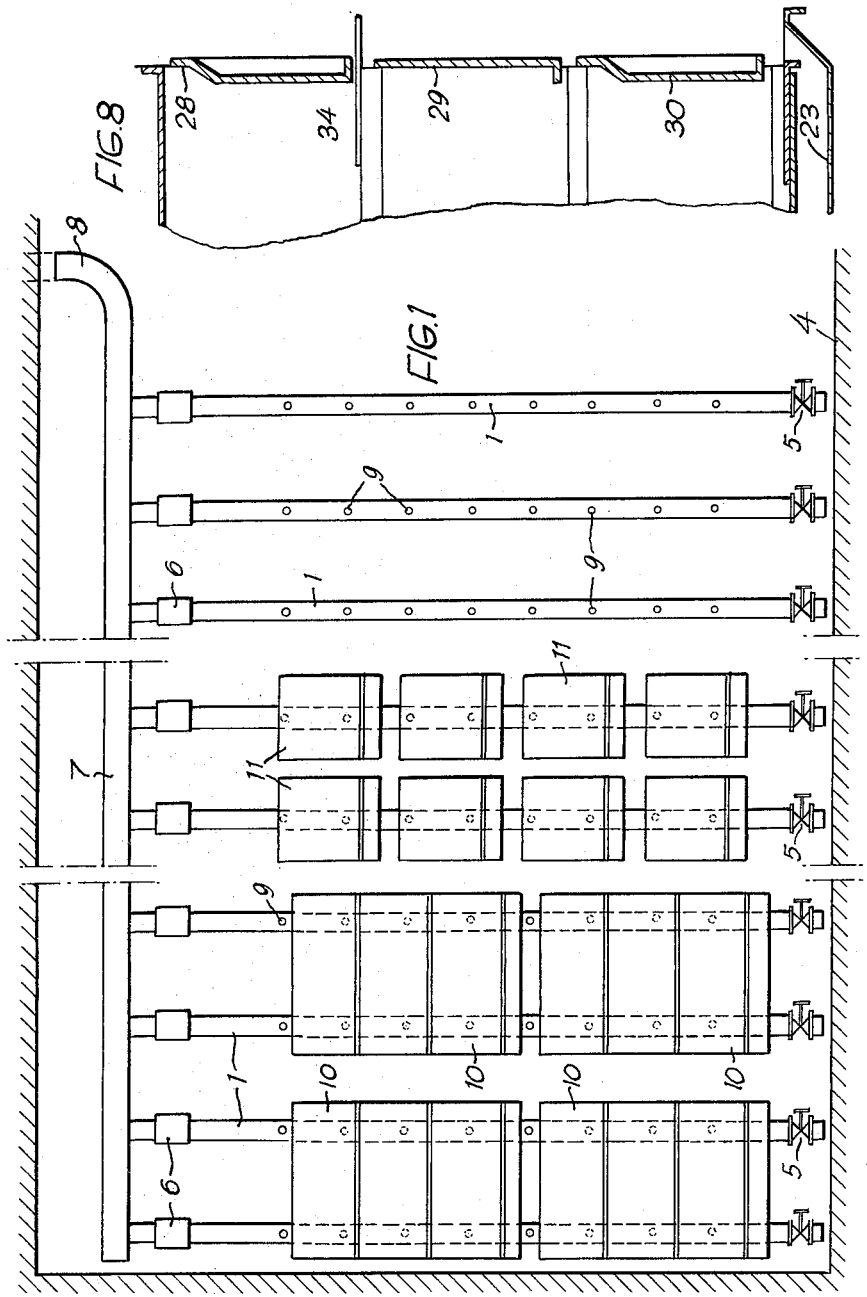

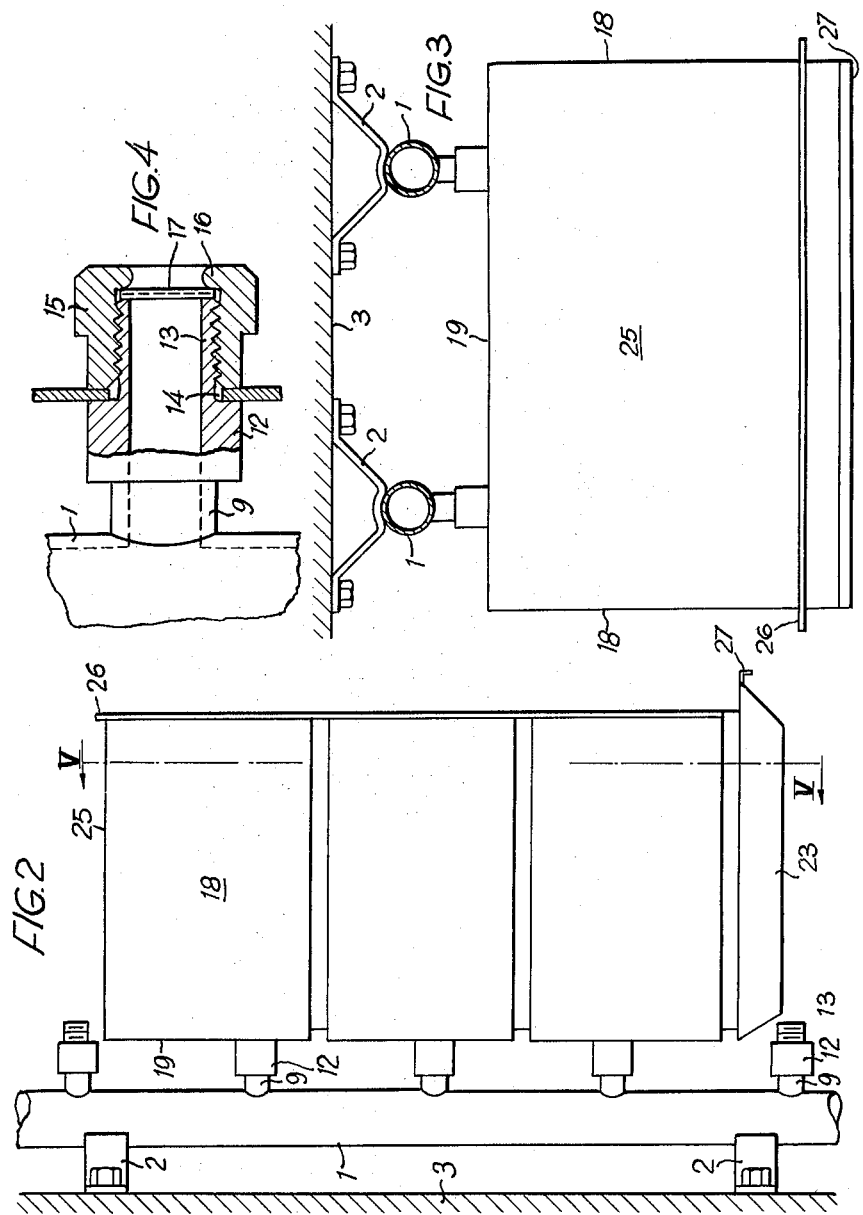

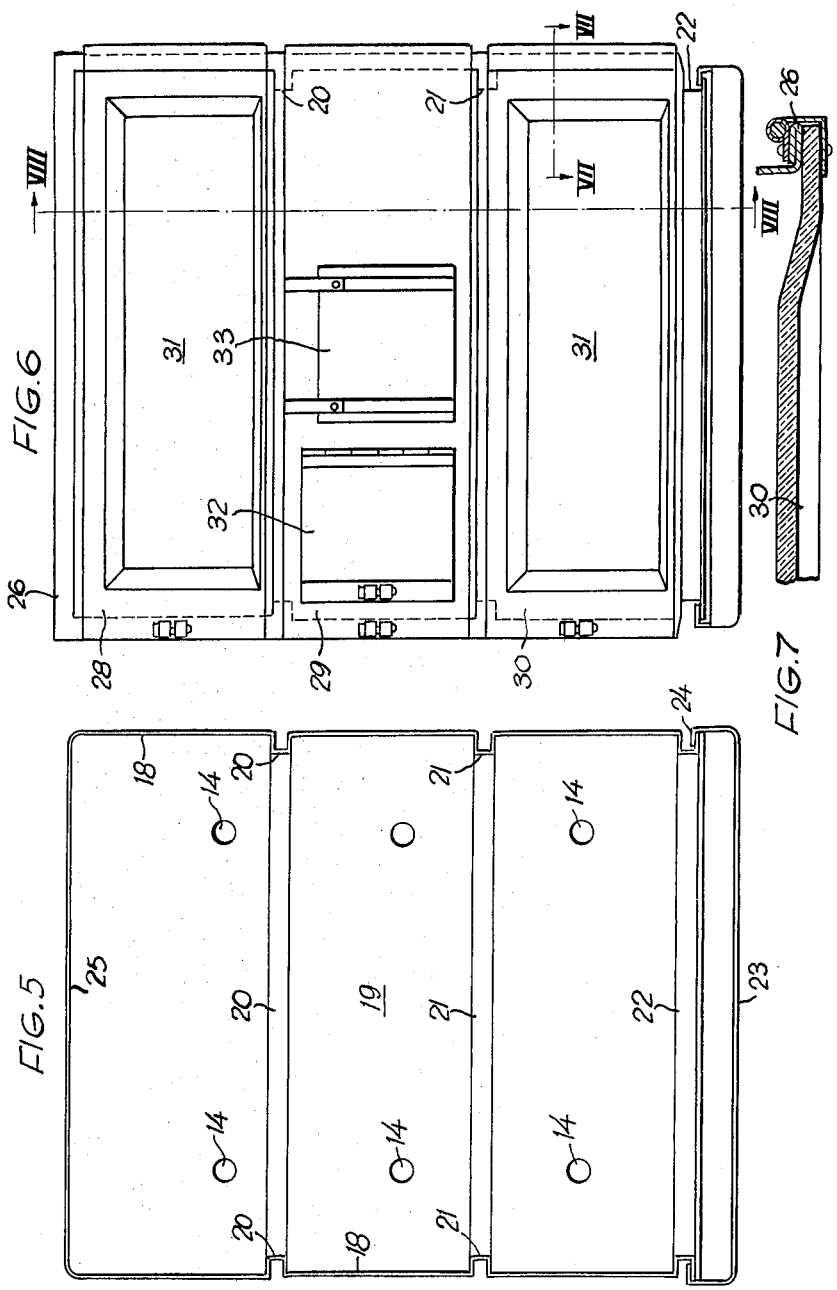

3,220,383
LABORATORY TEST ANIMAL CAGE WITH
HYGIENIC VENTILATION MEANS
Per-Olof Johan Brunér, Virebergsvagen 17, Solna, Sweden
Filed Mar. 23, 1964, Ser. No. 354,063
Claims priority, application Sweden, Mar. 26, 1963,
3,284/63
11 Claims. (Cl. 119—17)

Installations for keeping and tending test animals, especially for bacteriological research, are subject to special requirements concerning ventilation, possibilities of cleaning and disinfection, preventing cross infections between animals in adjacent cages, preventing the development of odor in the room and individual accessibility of the animals in different cages. There are further special demands on the possibility of easy cleaning of the cages and the room in which they are kept, on the adaptability of cage type, cage size and number of cages to momentary need of animals under observation and generally on the possibility of an easy maintaining of hygiene in a simple manner.

Many different means have been previously suggested, which comprise specially designed cages and means for setting them up, insets, ventilation arrangements and the like. It is for instance known to provide means for connecting the single cages to a common ventilation unit. Hitherto known means are however not satisfactory in several respects.

The above stated requirements and wishes are altogether satisfied by the present invention, which is characterized in that tubes, connected to a vacuum ventilation unit, are mounted onto a wall and have a number of pipe sockets along their length projecting into the room, cages having corresponding holes in their rear walls being provided for individual mounting on said pipe sockets by releasable fixing means and removal therefrom.

Hereby the following advantages are obtained.

The cages have no contact with each other or are at least independent of such contact for their mounting. The only fixtures for the cages are the easily removable couplings with the pipe sockets. The installation has no parts resting on the floor and leaves the floor entirely free for easy cleaning. The spaces between the tubes and between the studs can be chosen according to a module system, which makes it possible to mount cages of different sizes and different shapes for different purposes in any desirable arrangement, so that cages in appropriate number and size can be mounted in position according to the number and kind of test animals, such as monkeys, rabbits, mice etc.

Even a number of details of construction on the cage assist in the obtainment of the above purposes. A complete and quiet ventilation of the cages is obtained, which prevents air from circulating from the cages out into the room and the spreading of bad odor caused thereby. Recesses difficult of access and uneasy to clean are avoided. Urine, spilled water and spilled food cannot reach the outside of the cage and cause a pollution of the air in the room, soil underlying cages and make the cleaning more laborious.

Further details and means aiding in the obtainment of the above purposes will be apparent from the following description of an embodiment of the invention, illustrated diagrammatically in the accompanying drawings.

FIG. 1 is a front view of a wall in a room for keeping the animals and partially provided with cages. FIG. 2 is a side view of a monkey cage in a larger scale than FIG. 1. FIG. 3 is a detail, partly in section, showing the mounting means for the cages. FIG. 4 is an enlarged view from above of a fragment of a cage showing its mounting. FIG. 5 is a section along line V—V in FIG. 3. FIG. 6 is a front view of a monkey cage. FIG. 7 is a section of a part in a larger scale along line VII—VII in FIG. 6. FIG. 8 is a section along line VIII—VIII in FIG. 6.

As shown in FIG. 1 a number of vertical tubes 1 are mounted with equal spaces before a wall in the room, in which the cages are to be kept. In FIGS. 2 and 3 the mounting means 2 are shown, by means of which the tubes 1 are mounted onto the wall 3. The lower ends of the tubes 1 are spaced above the floor 4 of the room and there provided with a tap 5. The upper ends of the tubes are connected by easily disconnectible coupling members 6 to a common, transverse ventilation drum 7, which at 8 is connected to a vacuum ventilation unit (not shown). Along the sides of the tubes turned towards the inside of the room are mounted regularily spaced pipe sockets 9, so that an imaginary plane situated immediately in front of the tubes and parallel with the wall 3 contains a large number of pipe sockets 9 in horizontal and vertical rows with even spaces between the sockets of a row and between the rows. These pipe sockets 9, of which one is shown in detail in a larger scale in FIG. 4, are formed as mounting fixtures for the cages 10, 11, which because of the arrangement of the sockets 9 can be placed in any appropriate position in front of the wall 3.

The cages 10 and 11 are in principle constructed in the form of sheet metal cases with open front and bottom sides. Insets for more favourable contact between the animals and the walls or inner insulating insects can be mounted into the cage but has no connection with the present invention. The rear walls of the cages have holes placed with so calculated spaces between them and in such position relative to the height and width of the cages, that a number of cages of the same type can always be mounted in appropriate inter-arrangement by slipping the holes in the cages onto the pipe sockets 9. For the fixation of the cages on the pipe sockets 9, these are, as shown in FIG. 4, provided with an abutting flange 12 and a tube portion 13 projecting in front of the flange, said tube portion 13 having an outer screw threading. The holes 14 in the cages have a diameter, which with necessary play can be slipped over the tube portions 13 and which can abut against the front face of the flange 12. Then a nut 15 is screwed onto the threaded tube portion 13 to maintain the borders of the hole 14 against the flange 12. The nut 15, at its front end is preferably provided with an overlapping edge 16, by which a filter disc, a grid or the like 17 can be held over the mouth of the pipe socket. By these fastening means for the cages each cage is automatically connected to the ventilation system with a number of connections 9, which is essentially proportional to the size of the cage, there being no need to provide the cages with built-in channels or the like. Cages with at least two holes 14, for instance as the cages 11 in FIG. 1, need no other means for being maintained in position. Still smaller cages, which are fastened by only one hole onto one pipe socket 9, may be provided with supporting projections (not shown) on their rear sides in engagement with the tubes 1 to prevent their tilting.

The cage shown in FIGS. 2, 3, 5 and 6 is specially intended for keeping monkeys and has six connection holes 14 for the same number of pipe sockets 9. This cage has in a section parallel with the wall the profile shown in FIG. 5. Along the side walls 18 and the bottom walls 19 are horizontal, pressed in lists 20 and 21, which divide the height of the cage walls in three approximately equal parts. The side walls 18 and the rear wall 19 are along their lower border also provided with an inwardly projecting list 22, the lower, outwardly projecting border forming a guider for a tray 23, which can be pushed in under the open underside of the cage and on which inwardly bent upper border portions 24 cooperate with said guiders. As shown in FIGS. 2, 3 and 6 the top wall 25 and the side walls 18 have along their front edge a flange 26 surrounding the front of the cage on three sides. The front wall of the tray 23, which is inclined forwards and upwards, extends forwardly of the cage front defined by the flange 26 and in a downwardly bent gripping border 27 (FIGS. 2 and 3).

The front of the cage is, as shown in FIGS. 6 and 8 closed by individually operable doors 28, 29, 30 closing each a part of the cage front, the lower edges of said doors being placed at a little distance above the upper face of the lists 20, 21 and 22, respectively, leaving an air inlet gap between each other. The uppermost door 28 and the lowermost door 30 are of transparent material, preferably a thermoplastic material which is resistant to both mechanical and chemical attack, and have a panel 31 pressed towards the inside of the cage and a profile shown in FIG. 8. It is important, that the lower edge of the inner face of the door is situated a bit inwardly of the upper edge of the door below, so that urine and dirt flowing down on the inside of the door is always led on the inside of the cage. The middle door has a trap 32, in which a food trough or similar feeding device can be mounted, and an inspection, insertion, extraction or treatment port 33. The doors are hinged onto the one vertical side of the border flange 26 by a hinge device illustrated in FIG. 7. The lists 20, 21 and 22 can be used to support special inset means, such as climbing frames. The gaps formed between the lower edges of the doors and the upper faces of the lists 20, 21 and 22, respectively, can be used for inserting on any of the lists a plate, a grid or the like 34 (FIG. 8) for momentary separation of a portion of the cage. Thus, if it is desired to clean the cage, it is possible by drumming on the lower door 28 with the fingers to chase the monkey to the upper partition of the cage and then immediately to push in the plate 34, whereby the two lower doors 29 and 30 can be opened wide to clean the cage. Thereafter, the plate 34 is drawn out, the monkey goes to the lower part of the cage, the plate is pushed in again and the upper partition of the cage can be cleaned.

The monkey cage above described has been chosen as an example because it comprises all the elements, which can be found in any extent in the smaller cages, for instance for rabbits or mice. In FIG. 1 a number of rabbit cages 11 are shown. These are constructed according to the same principles as the monkey cage above described, only with the difference, that there are no horizontal lists and that there is only one door at the cage front, which, however, leaves air inlet gaps as well at its upper as at its lower edge. This door can appropriately be formed in the same manner as one of the doors 28 and 30 in the monkey cage described.

The device according to the invention permits a very easy handling and cleaning of the room and the cages kept therein. The floor is entirely free below the cages and therefore easily accessible for cleaning into the farthest corners. By the vertical arrangement of the ventilation tubes 1 any condensate formed therein will flow down to the lower ends of the tubes, wherefrom it can be let out through the taps 5. Preferably a device not shown for the rinsing of the tubes 1 can be provided so that rinsing liquid is led through a pipe into each of the upper ends of the tubes or into the ventilation drum 7. Through the gaps left below and above the doors the air drawn in by the ventilation unit flows in a quiet and wide stream without forming concentrated drafts within the cage but still with sufficient speed to prevent momentary flow of air out from the cage into the room. By the special arrangement of the doors for leading dirt so that it always stays within the cage and at last is collected in the tray 23, said air stream keeps the room in a high degree free from bad odor. From the bacteriological point of view, the device is very advantageous partly because of the easiness in keeping the room and the cages clean, partly by the absence of corners of uneasy access in the cages and the infection centers which can form in them, partly by preventing the flowing out of infected air and partly even by the possibility of keeping not only the cages but even the cooperating ventilation pipes clean with disinfecting means in a quick and simple manner.

I claim:

1. Apparatus for keeping and tending test animals comprising a room having a ceiling and vertical side walls, a plurality of spaced pipes secured to one of said side walls, a vacuum ventilation installation connected to the ends of said pipes, a plurality of pipe sockets connected to and communicating with said pipes and extending away from said side wall and a plurality of cages having substantially air impervious side walls, each cage having a hole in its rear wall detachably connected to one of said pipe sockets and at least one air inlet in the front wall.

2. Apparatus as defined in claim 1 in which said pipes are equally spaced along said wall and said pipe sockets are equally spaced along each pipe.

3. Apparatus as defined in claim 1 in which each cage has at least two holes in its rear wall connected to adjacent pipe sockets on the same pipe.

4. Apparatus as defined in claim 1 in which each cage has at least two holes in its rear wall connected to pipe sockets on adjacent pipes.

5. Apparatus as defined in claim 1 in which the lower ends of said pipes are closed by traps positioned above said floor.

6. Apparatus as defined in claim 1 in which said cages are detachably connected to said pipe sockets by internally screw threaded nuts engaging the externally screw-threaded ends of said pipe socket and bearing against the rear walls of said cages.

7. Apparatus as defined in claim 6 in which each end of each pipe socket is provided with a shoulder rearwardly of said screw-threaded end.

8. Apparatus as defined in claim 7 in which said nuts extend forwardly beyond the free ends of said pipe sockets, said apparatus comprising a filter secured in the front end of each nut.

9. Apparatus as defined in claim 1 in which each cage has a rectangular opening in its front side and a rectangular door covering the entire width of said opening but leaving spaces between its upper and lower edges and the adjacent edges of said opening.

10. Apparatus as defined in claim 1 in which each of said cages has at least one horizontally disposed inwardly extending ridge extending along each side wall and the rear wall thereof.

11. Apparatus as defined in claim 1 in which each cage has a rectangular opening in its front wall and a door for said opening, the upper edge of said door being positioned forwardly of the lower edge thereof.

References Cited by the Examiner

UNITED STATES PATENTS

| 489,657 | 1/1893 | Mudd | 119—10 |
| 2,007,917 | 7/1935 | McGrew | 119—18 |
| 2,061,712 | 11/1936 | Martin | 119—31 |
| 2,335,173 | 11/1943 | Corey | 119—21 |
| 2,653,569 | 9/1953 | Forester | 119—18 |
| 2,881,733 | 4/1959 | Young et al. | 119—15 |
| 3,086,498 | 4/1963 | Reynolds et al. | 119—17 |
| 3,160,140 | 12/1964 | Porter | 119—18 |

SAMUEL KOREN, *Primary Examiner.*

ALDRICH F. MEDBERY, *Examiner.*